(12) United States Patent
Wang

(10) Patent No.: US 8,116,016 B2
(45) Date of Patent: Feb. 14, 2012

(54) LENS MODULE SOCKET

(75) Inventor: Chin-Chou Wang, Tu-Cheng (TW)

(73) Assignee: Cheng Uei Precision Industry Co., Ltd., Tu-Cheng, Taipei Hsien (TW)

(*) Notice: Subject to any disclaimer, the term of this patent is extended or adjusted under 35 U.S.C. 154(b) by 203 days.

(21) Appl. No.: 12/696,032

(22) Filed: Jan. 28, 2010

(65) Prior Publication Data

US 2011/0181968 A1 Jul. 28, 2011

(51) Int. Cl.
*G02B 7/02* (2006.01)
(52) U.S. Cl. ......................................... 359/819; 359/811
(58) Field of Classification Search .......... 359/694–704, 359/811–829
See application file for complete search history.

(56) References Cited

U.S. PATENT DOCUMENTS

| 7,586,696 B2* | 9/2009 | Wu ................................ 359/819 |
| 7,813,062 B2* | 10/2010 | Lin ................................ 359/811 |
| 7,965,458 B2* | 6/2011 | Wang et al. .................... 359/827 |

* cited by examiner

*Primary Examiner* — Mohammed Hasan
(74) *Attorney, Agent, or Firm* — Cheng-Ju Chiang

(57) ABSTRACT

A lens module socket for receiving a lens module having a base portion includes an insulating housing, a plurality of conductive terminals received in the insulating housing, a shielding shell encircling the insulating housing, and a plurality of rotatable latches pivotally assembled to the insulating housing by a plurality of shaft pins. The insulating housing has a bottom base and side walls extended upwardly from the bottom base to surround a receiving chamber therebetween for receiving the lens module. The insulating housing defines a plurality of slits at the side walls for receiving the rotatable latches and a plurality of insertion holes extended downwardly from top portions of the side walls for receiving the shaft pins. The rotatable latches have press portions passing through the slits into the receiving chamber for pressing against the base portion of the lens module when the rotatable latches are rotated to a closed state.

6 Claims, 5 Drawing Sheets

LENS MODULE SOCKET

BACKGROUND OF THE INVENTION

1. Field of the Invention

The present invention relates to a lens module socket, and more particularly to a lens module socket for receiving a lens module to reduce the total height of the assembly thereof.

2. The Related Art

Because of the development of wireless communication and the rapid revolution in high technology, portable electronic products, such as mobile phones, PDAs and notebook computers, are assembled with different electronic additional-modules such as lens modules for taking pictures and satisfying desires of consumers. Correspondingly, the lens module sockets spring up for the lens modules.

In general, a lens module socket includes an insulating housing defining a receiving chamber therein for receiving a lens module, a plurality of conductive terminals received in the insulating housing, and a shielding shell encircling the insulating housing. The insulating housing has a bottom base and four side walls extended upwardly from the bottom base to surround the receiving chamber therebetween. The bottom base defines a plurality of terminal grooves for receiving the conductive terminals. The shielding shell defines a plurality of spring plates bent into the receiving chamber. When the lens module is received in the receiving chamber, the spring plates press down the lens module then the lens module presses down and electrically connects with the conductive terminals.

Because the spring plates could not provide enough pressure to make the lens module press down the conductive terminals completely, then the conductive terminals correspondingly push the lens module upwardly to form a space between the bottom base and a bottom of the lens module. As a result, the total height of the assembly of the lens module and the conventional lens module socket is increased consequently. Therefore, it is difficult to fulfill the compact size requirement of the electronic products.

SUMMARY OF THE INVENTION

It is an object of the present invention to provide a lens module socket for receiving a lens module to reduce the total height of the assembly thereof. In order to achieve above-mentioned object, the lens module socket of the present invention for receiving a lens module having a base portion includes an insulating housing, a plurality of conductive terminals, a shielding shell, a rotatable latch and a shaft pin. The insulating housing has a bottom base and side walls extended upwardly from the bottom base to surround a receiving chamber therebetween for receiving the lens module. The insulating hosing defines a slit substantially parallel to the bottom base and penetrating through one side wall to communicate with the receiving chamber and an insertion hole extended downwardly from a portion of a top of the one side wall to intersect with the slit. The conductive terminals are received in the insulating housing for electrically connecting with the lens module. The shielding shell encircles the insulating housing. The shielding shell has side plates and defines a slot at one side plate corresponding to the slit of the insulating housing. The rotatable latch is disposed in the slit. The rotatable latch has a press portion and a pivot portion extended sideward from one end of the press portion. The pivot portion defines a pivot hole in alignment with the insertion hole. The shaft pin is inserted into the insertion holes and the pivot holes for making the rotatable latch capable of pivoting on the shaft pin in a plane parallel to the bottom base. When the rotatable latch is rotated inwardly to a closed state, the press portion of the rotatable latch passes through the slit into the receiving chamber for pressing against a top of the base portion of the lens module.

As described above, when the rotatable latch is rotated inwardly to the closed state, the press portion tightly presses against the top of the base portion to make the lens module received in the insulating housing without the space formed between the bottom base and a bottom of the lens module, which reduces the total height of the assembly of the lens module socket and the lens module.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
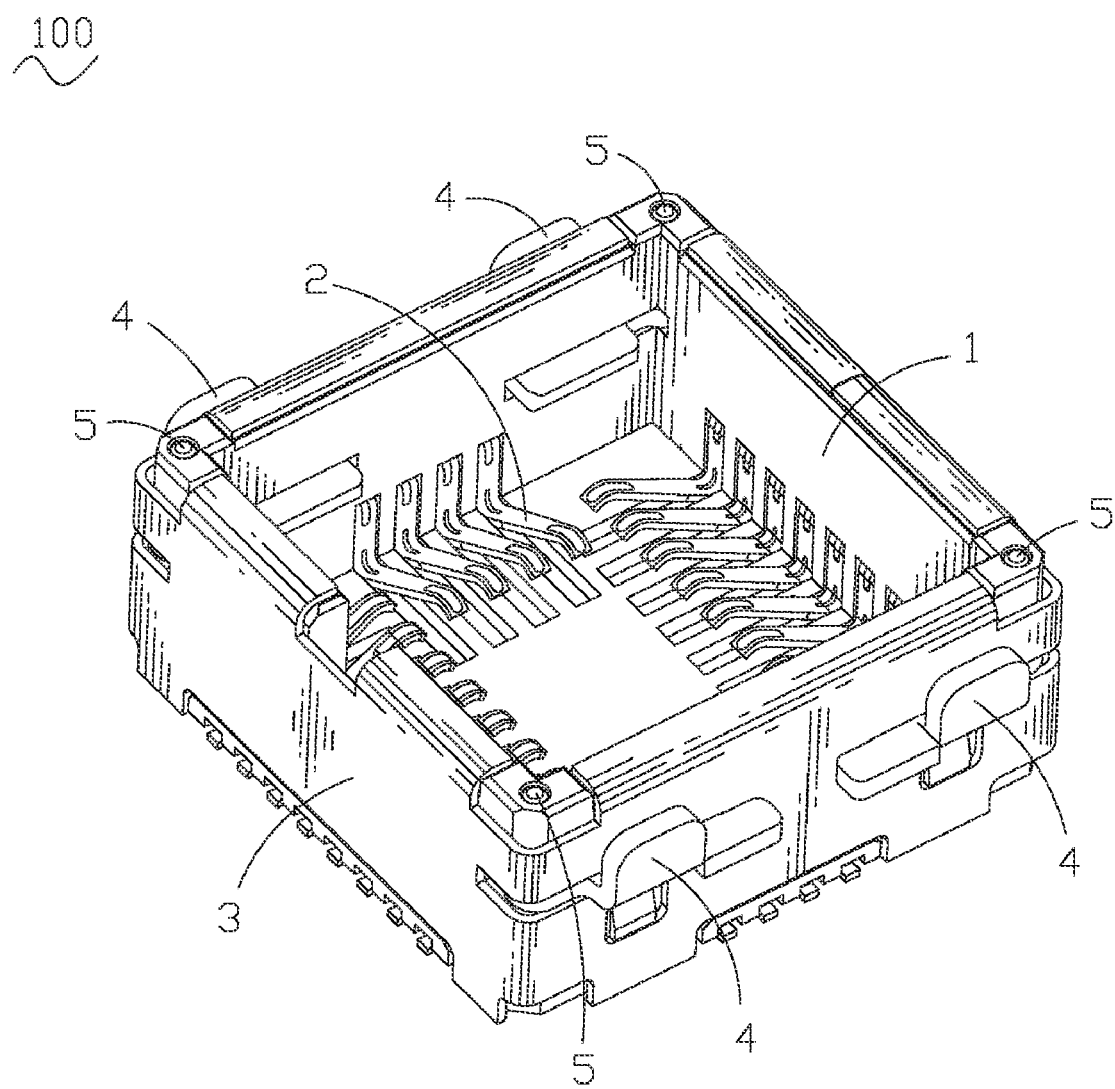
FIG. 1 is a perspective view of a lens module socket in accordance with the present invention.
Figure 2:
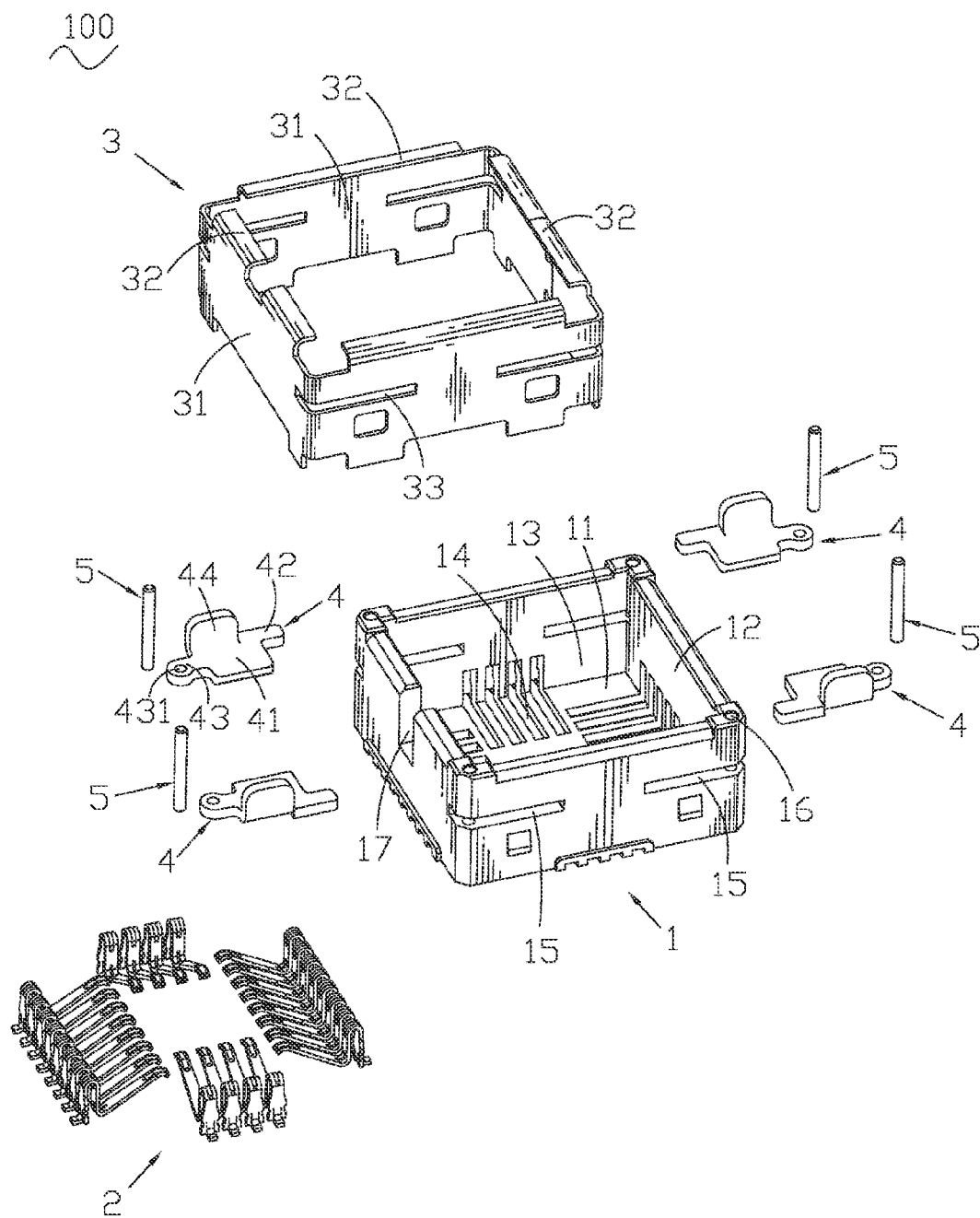
FIG. 2 is an exploded view of the lens module socket shown in FIG. 1.

With reference to FIG. 1 and FIG. 2, a lens module socket 100 according to the present invention includes an insulating housing 1, a plurality of conductive terminals 2 received in the insulating housing 1, a shielding shell 3 encircling the insulating housing 1, and a plurality rotatable latches 4 pivotally assembled to the insulating housing 1 by a plurality of shaft pins 5.

The insulating housing 1 has a flat bottom base 11 and four side walls 12 respectively extended upwardly from four sides of the bottom base 11 to surround a receiving chamber 13 therebetween. The bottom base 11 defines a plurality of terminal grooves 14 extended to the side walls 12 for receiving a plurality of conductive terminals 2. The insulating housing 1 defines a plurality of slits 15 substantially parallel to the bottom base 11 and penetrating through two opposite side walls 12 to communicate with the receiving chamber 13. Furthermore, an inside of one end of each slit 15 is blocked by an adjacent side wall 12. The insulating housing 1 also defines a plurality of insertion holes 16 respectively extended downwardly from a portion of a top of each side wall 12 to intersect with the slits 15. In this embodiment, the insertion hole 16 is defined in the junction of two adjacent side walls 12. Besides, one of the other two opposite side walls 12 defines a location trough 17 at an upper position thereof.

The shielding shell 3 has four side plates 31 connected to each other to form a hollow square or rectangle. The side plates 31 have a plurality of rim portions 32 extended inwardly from top edges thereof. The shielding shell 3 defines a plurality of slots 33 at two opposite side plates 31 for corresponding to the slits 15 of the insulating housing 1.

The rotatable latch 4 has a substantially rectangular press portion 41. Two opposite ends of the press portion 41 respectively extend opposite each other to form a resistance portion 42 and a pivot portion 43 which defines a pivot hole 431 thereon. The rotatable latch 4 further has a tab portion 44 extended upwardly from an outside thereof.

In assembly of the lens module socket 100, the conductive terminals 2 are firstly received in the terminal grooves 14 of the insulating housing 1. Then, the shielding shell 3 is assembled in a downward direction to encircle the insulating housing 1. The four side plates 31 wrap around the four side walls 12. The rim portions 32 press on top surfaces of the side walls 12. The slots 33 are corresponding to the slits 15. Next, the rotatable latches 4 pass through the slots 33 to locate in the slits 15 with the pivot holes 431 in alignment with the insertion holes 16. And finally, the shaft pins 5 are inserted into the insertion holes 16 and the pivot holes 431 to make the rotatable latches 4 pivotally assemble to the insulating housing 1 so that the rotatable latches 4 are capable of pivoting on the shaft pins 5 in a plane parallel to the bottom base 11.

Figure 3:
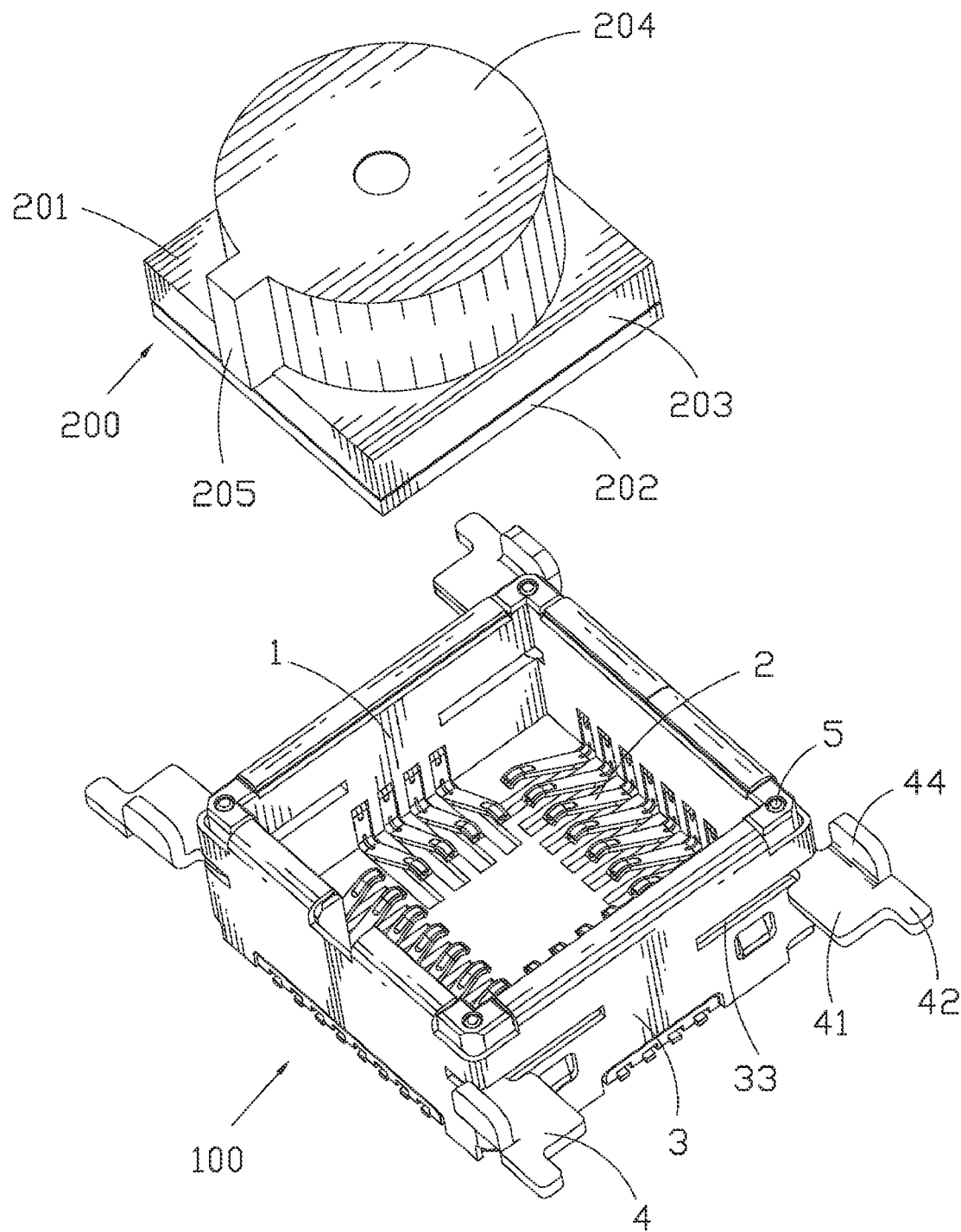
FIG. 3 to FIG. 5 are perspective views illustrating an assembly process of a lens module being assembled to the lens module socket.
Figure 4:
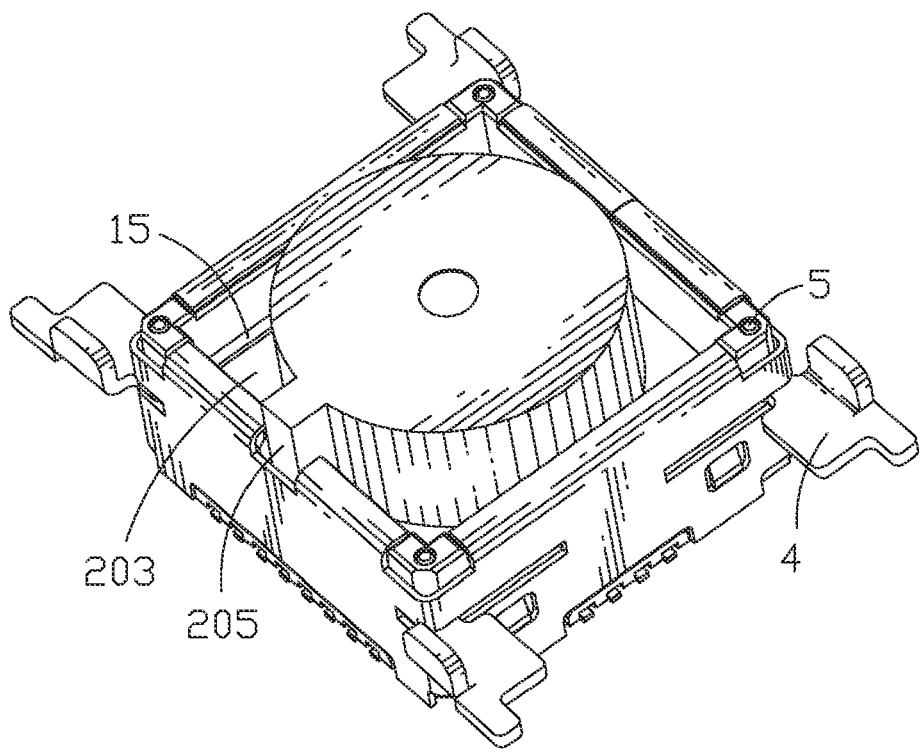
Figure 5:
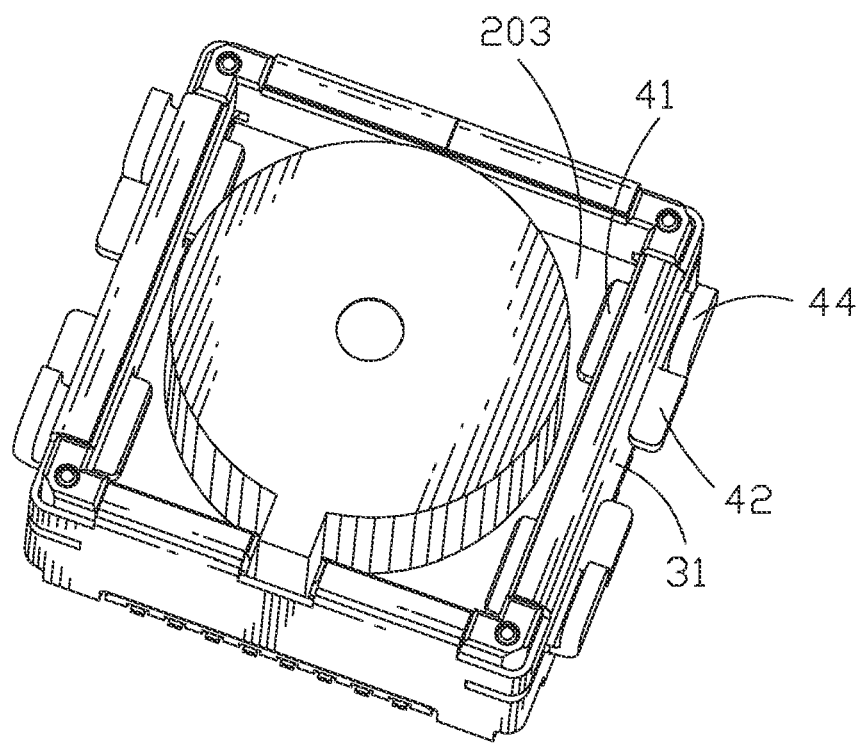

FIG. 3 to FIG. 5 shows an assembly process that a lens module 200 is assembled to the lens module socket 100. The lens module 200 includes a main body 201 and a printed circuit substrate 202 attached to a bottom of the main body 201. The main body 201 has a substantially rectangular base portion 203 and a substantially cylindrical lens portion 204 extended from a top of the base portion 203. The lens portion 204 has a projection 205 provided at an outer periphery thereof.

Figure 6:
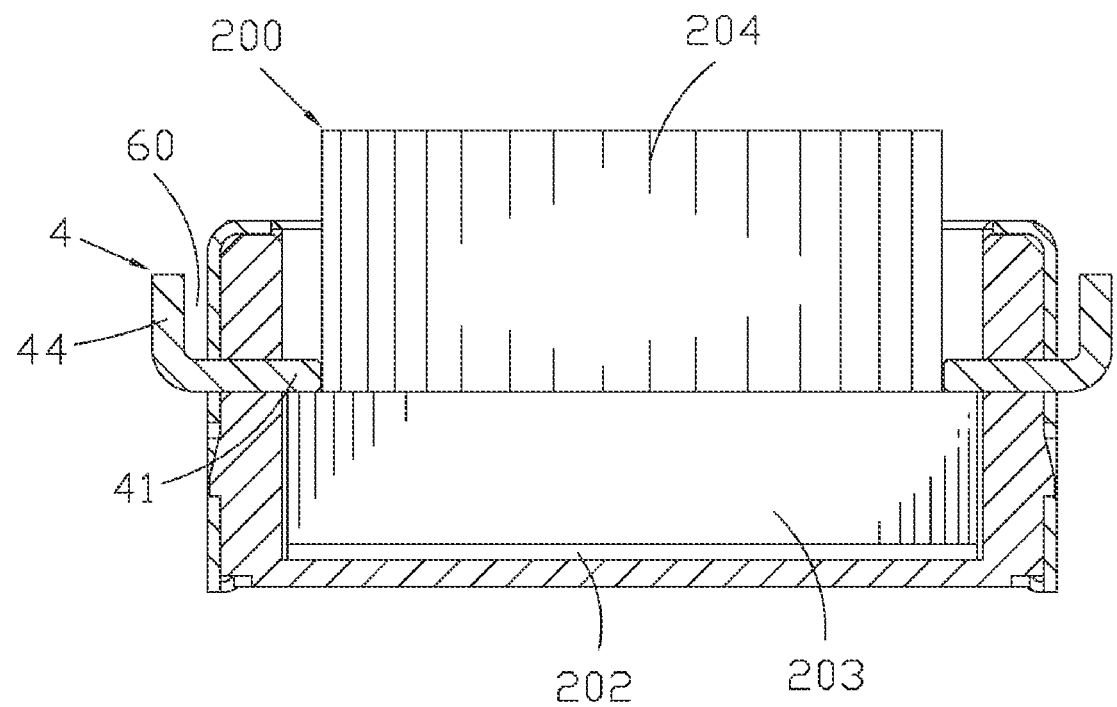
FIG. 6 is a cross-sectional view of FIG. 5.

Referring to FIG. 3, before the lens module 200 is assembled to the lens module socket 100, the rotatable latches 4 are rotated outwardly to an open state. Then the lens module 200 is pressed down to be received in the receiving chamber 13 with the projection 205 disposed in the trough 17. When the top of the base portion 203 is lower than the slits 15 as shown in FIG. 4, the rotatable latches 4 are rotated inwardly simultaneously until the resistance portions 42 are against outsides of the side plates 31 of the shielding shell 3, the rotatable latches 4 is rotated to a closed state as shown in FIG. 5. In this case, the press portions 41 pass through the slits 15 into the receiving chamber 13 and tightly press against two opposite portions of the top of the base portion 203 to ensure the lens module 200 can be received in the receiving chamber 13 without the space formed between the bottom base 10 and the printed circuit substrate 202 as shown in FIG. 6. Therefore, the assembly of the lens module socket 100 and the lens module 200 reduce the total height. Meanwhile, the conductive terminals 2 are pressed to electrically connect with the printed circuit substrate 202. Furthermore, a gap 60 is formed between the tab portion 44 and the side plate 31, which provides convenience to a user pulling the tab portion 44 to rotate out the rotatable latch 4 with fingers or other tools.

As described above, when the rotatable latches 4 are rotated inwardly to the closed state, the press portions 41 tightly press against the two opposite portions of the top of the base portion 203 to make the lens module 200 received in the insulating housing 1 without the space formed between the bottom base 10 and the printed circuit substrate 202, which reduces the total height of the assembly of the lens module socket 100 and the lens module 200.

What is claimed is:

1. A lens module socket for receiving a lens module having a base portion, comprising:
    an insulating housing, the insulating housing having a bottom base and side walls extended upwardly from the bottom base to surround a receiving chamber therebetween for receiving the lens module, the insulating housing defining a slit substantially parallel to the bottom base and penetrating through one side wall to communicate with the receiving chamber and an insertion hole extended downwardly from a portion of a top of the one side wall to intersect with the slit;
    a plurality of conductive terminals received in the insulating housing for electrically connected with the lens module;
    a shielding shell encircling the insulating housing, the shielding shell having side plates and defining a slot at one side plate corresponding to the slit;
    a rotatable latch disposed in the slit, the rotatable latch having a press portion and a pivot portion extended sideward from one end of the press portion, the pivot portion defining a pivot hole in alignment with the insertion hole; and
    a shaft pin inserted into the insertion hole and the pivot hole for making the rotatable latch capable of pivoting on the shaft pin in a plane parallel to the bottom base;
    wherein the press portion of the rotatable latch passes through the slit into the receiving chamber for pressing against a top of the base portion of the lens module when the rotatable latch is rotated inwardly to a closed state.

2. The lens module socket as claimed in claim 1, wherein the slit and the insertion hole are defined in each of two opposite side walls for receiving the corresponding rotatable latch and the shaft pin, the slot is defined in each of two opposite side plates of the shielding shell.

3. The lens module socket as claimed in claim 2, wherein each of the opposite side walls defines two slits and two insertion holes corresponding to the two slits at two ends thereof, for receiving two rotatable latches and two shaft pins, respectively.

4. The lens module socket as claimed in claim 3, wherein an inside of one end of each slit is blocked by an adjacent side wall, the insertion hole is defined in the junction of two adjacent side walls.

5. The lens module socket as claimed in claim 1, wherein the rotatable latch has a resistance portion extended opposite to the pivot portion from an outside of the other end of the press portion, when the rotatable latch is rotated to the closed state, the resistance portion is against an outside of the shielding shell.

6. The lens module socket as claimed in claim 1, wherein the rotatable latch has a tab portion extended upwardly from an outside thereof with a gap formed between the tab portion and the shielding shell when the rotatable latch is rotated to the closed state.

* * * * *